INVENTORS.
PETER C. GOLDMARK &
BERNARD ERDE
BY
Brumbaugh, Free, Graves & Donohue
their ATTORNEYS Oct. 28, 1969 P. C. GOLDMARK ET AL 3,475,549

METHOD AND APPARATUS FOR RECORDING COLOR PICTURE INFORMATION ON FILM

Filed Dec. 5, 1966 4 Sheets-Sheet 2

INVENTORS.
PETER C. GOLDMARK &
BERNARD ERDE
BY
Brumbaugh, Free, Graves & Donohue
their ATTORNEYS INVENTORS.
PETER C. GOLDMARK &
BERNARD ERDE
BY
Brumbaugh, Free, Graves & Donohue
their ATTORNEYS INVENTORS.
PETER C. GOLDMARK &
BERNARD ERDE
BY
Brumbaugh, Free, Graves & Donohue
their ATTORNEYS United States Patent Office 3,475,549

Patented Oct. 28, 1969

3,475,549

METHOD AND APPARATUS FOR RECORDING COLOR PICTURE INFORMATION ON FILM

Peter C. Goldmark and Bernard Erde, Stamford, Conn., assignors to Columbia Broadcasting System, Inc., New York, N.Y., a corporation of New York Filed Dec. 5, 1966, Ser. No. 599,216
Int. Cl. H04n 1/46, 9/02
U.S. Cl. 178—5.2 26 Claims

ABSTRACT OF THE DISCLOSURE

This specification discloses the method and apparatus for recording, in separate areas of a record medium, the luminance and color information contained in the scenes of an original record medium. A projector forms the optical image of the original record; a color television camera views the image and produces signals representative of the luminance and color information; recording means responsive to the signals records the luminance and color information on separate areas of the recording medium, for example, in successive frames. A method for reproducing the color information from the sequentially-arranged medium for transmission is also disclosed. The film is continuously advanced through a scanning zone; two beams scan sequential frames of the medium (one beam scans the luminance image while the other scans the color image); means sensitive to the two beams produce electrical signals representative of the luminance and color images; and a switch having two inputs connected to the sensing devices alternates in such a manner as to provide only luminance information to one output terminal, and color information to the other.

This invention relates to the recording of color picture information contained on an original record, such as positive or negative color film. More particularly, the invention deals with improved techniques, methods and apparatus for recording in separate frame areas on a record medium the luminance and color information of original record scenes.

There are several known methods for transferring color picture information from an original record onto a record medium, such as a strip of film for later television broadcasting. In some of those methods, the film being recorded is exposed with the light spot of a cathode ray or line scan tube in which the intensity of the light spot is modulated by the luminance information in the original scene. In one early proposed recording scheme, primary color information, e.g., the red and blue content of the original scene, was recorded in separate frames on the film, laterally spaced from the frame containing luminance information. In this scheme the luminance and primary color signals for modulating the intensity of the recording beams are derived from a conventional television camera.

In other, less sophisticated, systems, conventional color separation techniques are employed to optically record separate red, blue and green or brightness frames on the record medium, all of which must be scanned simultaneously to develop suitable luminance and chroma signals for television transmission.

In still other proposed methods, chroma information is recorded in superimposed relation to the luminance information, both types of information being recorded in a raster format on a single frame area. In systems using these methods, chrominance information is used to modulate a color carrier, which may be suppressed, having a frequency distinct from the bandwidth occupied by the luminance information. When the carrier is suppressed, a pilot or reference carrier must also be recorded in order to recover the original chrominance signals. Where the modulated color carrier (or the carrier sidebands when the carrier has been suppressed) is recorded in the same frame with the luminance or brightness information, the bandwidth of the chrominance information signals must be severely restricted if the brightness signal bandwidth is to be wide enough to yield acceptable brightness resolution.

Because of these and other deficiencies of the mentioned recording methods, therefore, it has been deemed preferable to record brightness and color information of the original scene in separate frames or frame portions on the film. Luminance, or picture brightness, information may then be recorded optically, either by direct photographing or with a recording beam tracing out a raster composed of a series of mutually displaced parallel lines. Preferably, such picture brightness and color information are recorded in separate adjacent parts of the same motion picture frame, with the color information being recorded in a similar raster format made up of a series of mutually displaced parallel lines of which each includes a color modulated carrier or the carrier sidebands thereof.

In many of the described methods, the time necessary for recording each frame of an original frame is substantially increased by the pull-down time of the camera mechanism, unless continuous film motion recording techniques are employed. When intermittent motion of the record medium is desired, as for recording picture information in a raster format, a reduction in pull-down time can be accomplished only through the introduction of complex mechanical equipment.

The present invention generally encompasses the latter recording scheme, with the object of recording the original record scenes as rapidly as practicable and with fairly conventional mechanical components. Accordingly, a first frame portion of a monochrome record to be recorded is exposed with an image of luminance contained in the original scene. This image may be either presented to the film as a composite optical image or laid down by a light or an electron recording beam tracing out a raster scan. In an adjacent frame or frame portion, color information is recorded in a raster format wherein the raster lines contain a record of a periodic waveform of the sidebands of the amplitude-modulated color carrier, along with a record of the pilot carrier.

The recording system includes a projector for forming optical images of the original record at a predetermined frame rate. A color television camera scans the optical image of each original scene with a pair of conventional television scanning fields to develop signals representing color information in the scene viewed thereby. A record medium camera exposes a first frame portion of the film to be recordd with an image of luminance of information, and a second frame portion with an image of a monochrome representation of color information derived from the color information signals. In accordance with one aspect of the invention, the color information is recorded during a time interval occupied by only one of the television scanning fields. The record medium is then advanced, during the time interval occupied by the other of the television scanning fields, to expose a successive frame or frame portion of the film.

A single electron beam may be used to record luminance and color information, if desired. In this event, the modulating inputs to the beam (chroma and luminance) are switched at a rate synchronized with the periodicity of the television scanning fields.

Preferably, the rate at which the lines of the color information raster image are laid down on the record medium is synchronized with the rate of scanning of the television camera, and the sweep frequency of the recording beam is equal to or a multiple of the television field scanning rate.

During reproduction, the separate frame portions corresponding to the recorded scene are scanned simultaneously with either a line or raster scan device to develop signals suitable for conventional television broadcasting or for display on suitable reproducing apparatus.

For a better understanding of the invention, together with the further advantages and objects thereof, reference may be made to the following detailed description and to the drawings, wherein.

Figure 1A:
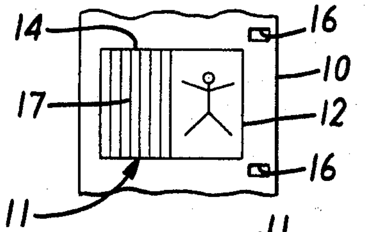
FIGURES 1A and 1B are plan views of a record medium frame illustrating representative formats for the recording of luminance and color picture information with apparatus in accordance with the invention.

A typical monochrome record of color information is shown in FIGURE 1 and comprises a conventional film base 10 of, for example, 16 mm. or 35 mm. width having recorded thereon a succession of frames 11 of color picture information. Each frame is divided into two adjacent portions 12, 14, with the frame portion 12 recorded with luminance, or picture brightness, information. Such luminance information may be anamorphosed and recorded either optically or electronically, as will be described in greater detail below, with the image extending in the direction parallel to the extent of the film. Preferably, each frame 11 bears a specific longitudinal spacial relationship to the sprocket holes 16.

The color information in the frame portion 14 is comprised of a succession of mutually displaced parallel lines, with the lines running laterally across the frame portion 14. Each of the lines may contain a record of the sidebands of a color carrier which has been amplitude modulated with chrominance information received from a television camera chain. In addition, each of the lines may contain a pilot or reference carrier in superimposed relation to the sideband waveform for recovering the chrominance information when the color picture on the record is reproduced.

The pilot or reference signal carrier is preferably of a frequency extraneous to the frequency bandwidth associated with the color carrier sidebands so that it will not be visible when the record is "played." Additionally, it is desirable that both the color carrier and the pilot carrier be multiples of the line scan rate used in recording the transverse lines so that the recorded color or chrominance information tends to appear as a series of longitudinally extending bars or lines 17 in the frame portion 14, thereby maintaining the phase relationship of the carrier recorded in the scan lines.

Figure 1B:
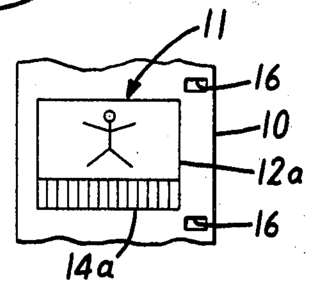

In FIGURE 1B, the frame portion **12*a* containing the image of luminance information in the recorded scene is longitudinally displaced from the frame potrion 14*a* in which color informtion is recorded. Here, the picture image in the frame portion 12*a* may be anamorphosed in the longitudinal direction so that the ratio of the height of the image to the image width is, for example, 2:4. The frame portion 14*a*, in such case, may have a dimensional height to width ratio of about 1:4. Alternatively, of course, the ratios of each portion 12*a*, 14*a* may be made equal. Luminance and chrominance information is recorded in the same manner as explained in conection with FIGURE 1A, except for the onted difference that the portion 14*a* is in longitudinally spaced relation to the luminance frame portion 12*a***, rather than in laterally spaced relation shown in FIGURE 1A.

Figure 2:
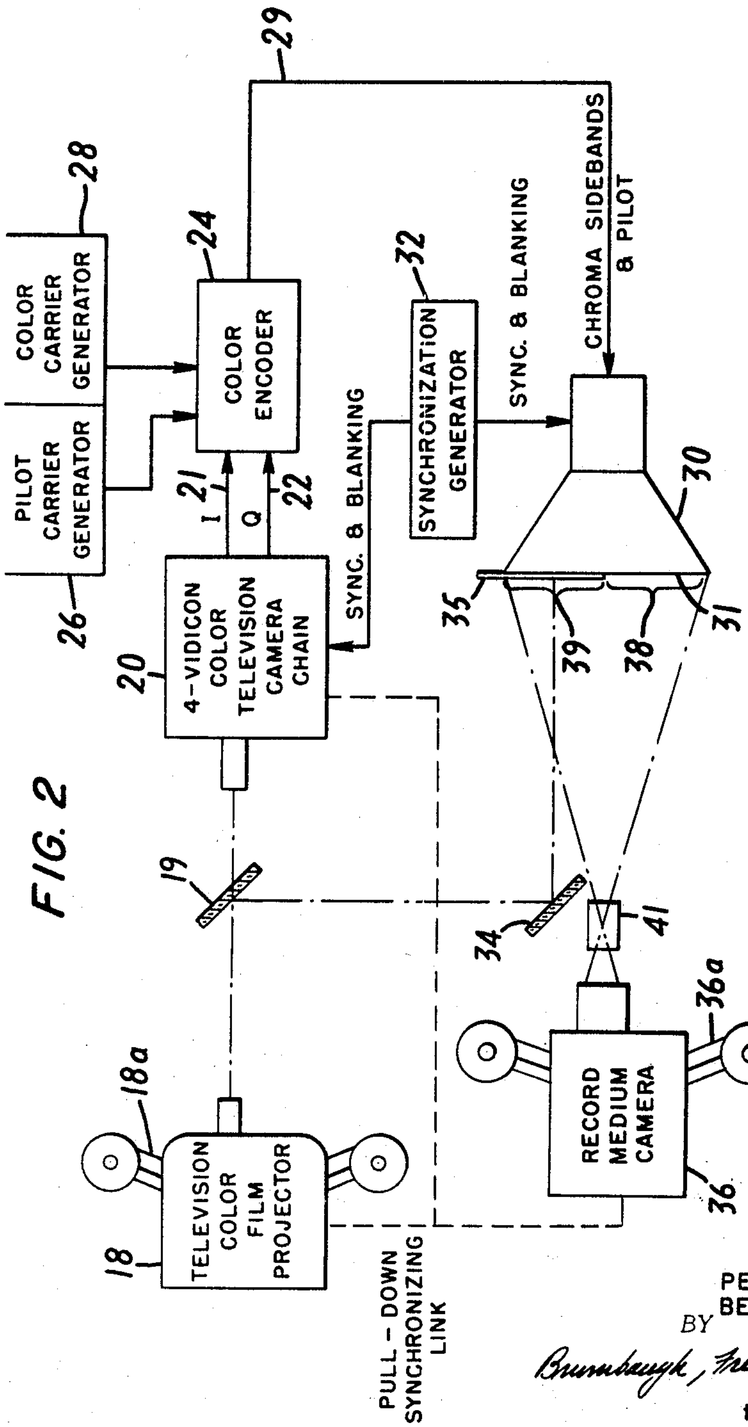
FIGURE 2 is a schematic representation of a typical system for producing a color picture record of the type shown in FIGURE 1.

Referring now to FIGURE 2, a system is shown for producing a color picture record of the type shown in FIGURE 1A. The system includes a conventional television color film projector 18 for forming images of the color picture scenes contained on an original positive or negative color film **18*a*. Part of the light of the images so formed passes through a half-silvered mirror 19 to a four-vidicon color television camera chain 20 which conventionally scans the images with a pair of raster scanning fields. The television camera chain 20 develops color information signals which may be of the color difference type, e.g., $R-Y$ or $B-Y$, or the more conventional chrominance signals I and Q. Assuming that the latter are developed, the I and Q chrominance signals are passed over the conductors 21 and 22 to a color encoder 24 which also receives a pilot carrier from the generator 26 and a color carrier from the generator 28**.

The color encoder unit 24 may include a pair of balanced modulators each receiving one of the chrominace signals I and Q for modulating the color carrier signal from the generator 28. The resultant signal then comprises the color carrier sidebands of the suppressed color carrier. This sideband signal is combined with the pilot carrier in a conventional adder and is employed to modulate the intensity of the light spot produced by the cathode ray tube 30. A more detailed description of the color encoder 24 may be found in the copending application Ser. No. 519,106 for "Color Film Recording and Reproducing Apparatus," filed Jan. 6, 1966 and assigned to the assignee of this invention.

Synchronizing signals are supplied by a synchronization generator 32 to both the color television camera chain 20 and the cathode ray tube 30 such that the coded color inforamtion from the unit 24 is displayed on the face 31 of the cathode ray tube in timed relation to the scanning of the original scene images by the television camera 20.

Approximately half of the light in the image formed by the film projector 18 is reflected by the half silvered mirror 19 to the reflecting mirror 34. The mirror 34 in turn directs an image of the scene being viewed by the television camera 20 to an image plane formed by the surface of a flat plate 35 covered with a light-diffusing substance such as magnesium carbonate or chalk. A record medium camera 36 containing the record medium **36*a* to be recorded photographs the color information displayed on the face 31 of the cathode ray tube 30 in the area 38, along with the optical image formed on the surface of the plate 35 in the area bracketed at 39. For the purpose of obtaining proper focus of the images projected on the plate 35 and the face 31 of the cathode ray tube 30, a lens system 41 may be employed. These images are presented to an exposure zone within the record medium camera 36** for exposing adjacent portions of each record medium frame to the respective images.

In accordance with the invention, the scanning rate of the color television camera chain 20 is synchronized with the advancement of the original film **18*a* through the projector 18 and with the advancement of the record medium 36*a* in the record medium camera 36. In order to satisfactorily record luminance and color information as rapidly as possible within the operating limits of conventional projection and camera apparatus, the advancement of the record medium in the camera 36 is arranged to be carried out during the time interval occupied by one of the scanning fields of the television camera chain 20**. This may best be explained with reference to a specific example, as follows.

Assuming that conventional scanning rates are used in the television camera chain 20, e.g., a 60-field, 30-frame rate, each frame of the record medium in the camera 36 is exposed for 1/60 second, during which time one complete raster of color information is formed on the face 31 of the cathode ray tube. Also during this time, of course, a continuously present optical image appears on the surface of the image plate 35 adjacent the face 31 of the cathode ray tube. During the next 1/60 second interval (the time interval occupied by a successive scanning field of the color television camera chain 20), the original film 18*a* and the record medium 36*a* are advanced one frame for exposure of a successive record medium frame.

The pull-down rate, or frame rate, through the color film projector 18 during recording is identical to the pull-down rate in the camera 36, or 30 frames per second. Each recorded frame, then, corresponds to one frame of the original record. Where recording is done from a conventional 24 frame/sec. motion picture film, every fourth frame of the original can be recorded on two successive color and monochrome frame portions of the record medium 36*a*, so that an "optical-chasing" print is obtained. Synchronization between the camera chain 20, the color film projector 18 and the record medium camera 36, indicated by the dashed line connections between these elements, is effected in a conventional manner. As an example, however, the synchronization may be tied to the vertical blanking signals developed by the synchronization generator 32 or the television camera chain 20 so that pull-down is initiated at the beginning of every other television scanning field. In the foregoing manner, simultaneous recording of luminance and color information in the separate frame portions of the record medium can be practicably realized within known limitations of currently available equipment.

Figure 2A:
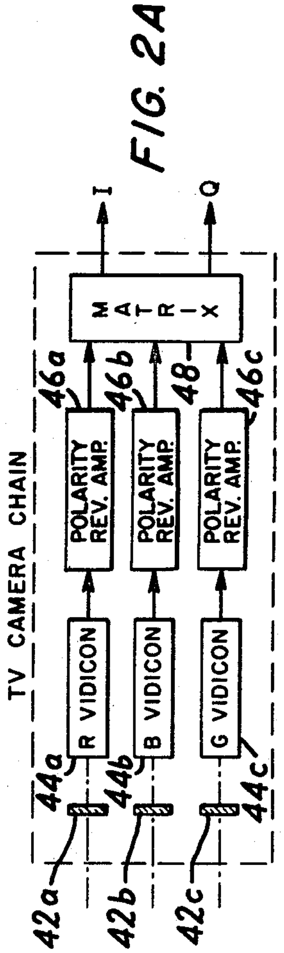
FIGURE 2A is a modification of the FIGURE 2 system for recording color scenes carried by a color negative film.

The FIGURE 2 system is equally compatible for use with either a positive or negative film record. To accomplish direct recording from a color negative film, the television camera may include means for reversing the electrical polarity of the primary color signals from the individual vidicon units within the camera. Referring to the highly simplified schematic diagram of FIGURE 2A, images of the viewed scene are presented to color separation filters 42*a*, 42*b* and 42*c* which separate out the respective primary color contents of the scene for scanning by the associated vidicon detectors 44*a*–44*c*. The electrical output of the red, blue and green vidicons 44*a*, 44*b* and 44*c*, respectively, are each routed to a respective polarity reversal amplifier 46*a*, 46*b* and 46*c*. Each of the amplifiers 46*a*–46*c* reverses the polarity of the electrical signal at its input and feeds the polarity-reversed signal to a standard electrical matrix 48 for development of the chrominance signals I and Q.

Figure 3:
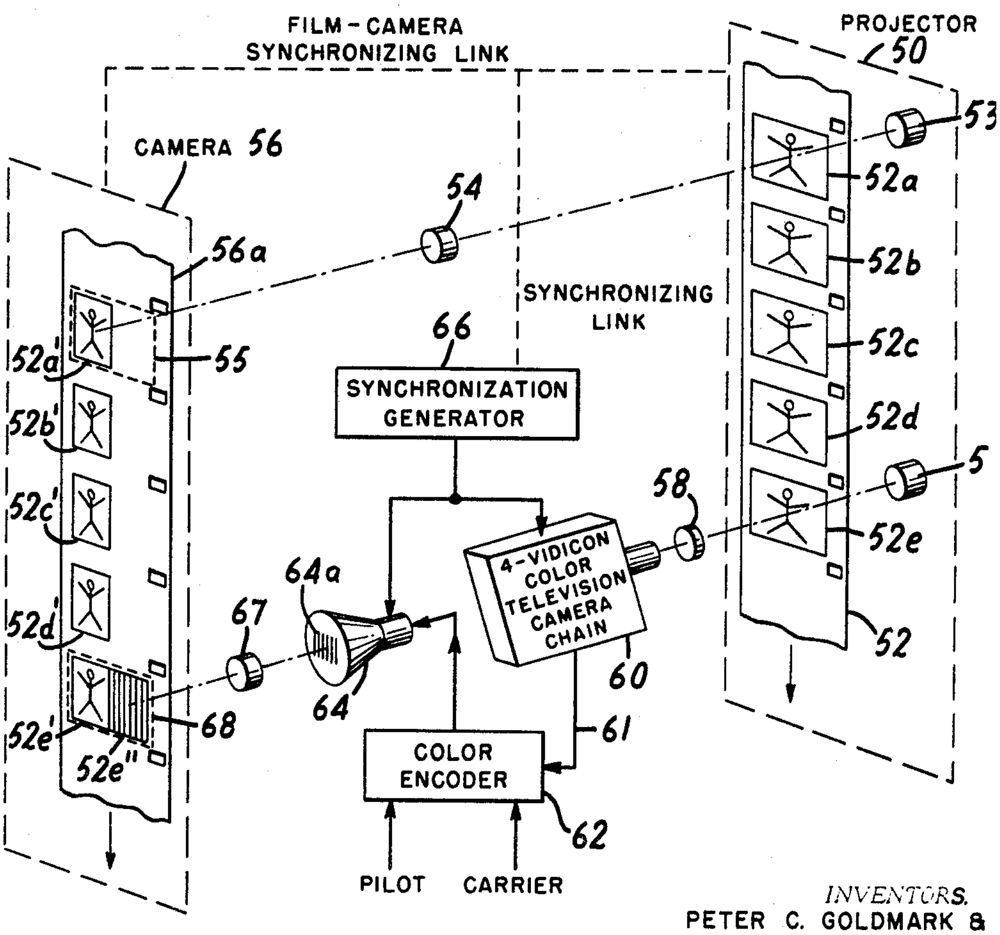
FIGURE 3 is a schematic illustration of a further recording system of the general type shown in FIGURE 2.

An alternate recording technique is shown in FIGURE 3. In the system illustrated, a television color film projector 50 produces one image each of a pair of frames on the original film 52, separated by a multiple 1, 2, 3 . . . of the frame pitch distance. A first light source 53 in the projector forms an image of, for example, the frame 52*a* and projects the image so formed through a lens system 54 to a first exposure zone 55 in the record medium camera 56. This image is recorded on a frame portion 52*a'* on the record medium 56*a*. Simultaneously, a second light source 57 forms an image of another of the original film frames, for example 52*e*, and presents this image through a second lens system 58 to the color television camera chain 60 which develops color information signals and feeds them over the conductor 61 to the color encoder 62.

In a manner similar to that explained in connection with FIGURE 2, the color encoder 62 produces color carrier sideband and pilot carrier signals for application to the cathode ray tube 64. As before, a synchronizing generator 66 synchronizes the operation of the television camera chain 60 with the presentation of the coded color information on the face 64*a* of the cathode ray tube 64. The image of the monochrome display on the cathode ray tube 64 is focused through another lens systems 67 onto an adjacent frame portion 52*e''* of a corresponding record medium frame in a second exposure zone 68 in the camera 56.

The second exposure zone 68 is displaced from the zone 55 by a distance corresponding to a frame pitch distance multiple that is related to the multiple associated with original record frames. Thus, in operation, luminance information in the form of an optical image of an original record frame 52*e* is first recorded in a first frame portion 52*e'* on the record medium 56*a* in the first exposure zone 55. After the original record 52 and the record medium 56*a* have advanced, for example, four frames, i.e., through a distance corresponding to four times the frame pitch distance, the original record frame 52*e* is scanned by the television camera chain 60 to develop corresponding color information for display on the cathode ray tube 64. An image of this display is projected onto the portion of the record medium in the second exposure zone 68 to expose a frame portion 52*e''* adjacent the portion 52*e'*. Simultaneously, the frame portion 52*a'* is exposed with an image of the original record frame 52*a*. Meanwhile, optical images of frames 52*b*, 52*c* and 52*d* have been recorded in the frame portions 52*b'*, 52*c'* and 52*d'*, respectively. In the foregoing manner, luminance information and color information are recorded at times separated by the time required for the advancement of the record medium 56*a* through the appropriate number of frames.

It will be appreciated that in this system also, the record medium 56*a* is advanced during one of the television scanning fields. Thus the monochrome representation image of the color information may be presented on the face 64*a* of the cathode ray tube as a 262½ line raster (1 television scanning field), and the record medium 56*a* advanced during the time interval occupied by the next 262½ scanning lines by the television camera chain 60.

The system of FIGURE 3 is, in one respect, more advantageous than the FIGURE 2 system in that exposure of the first frame portion may be controlled independently of the exposure of the second frame portion. It is moreover possible in this system to have the frame portion containing color information separated from the frame portion containing the associated luminance information. For example, the cathode ray tube 64, camera 56 and lens 67 can be arranged to record the frame portion 52*e''* adjacent the frame portion 52*c'*. In such case, the reproducing system will be arranged to scan each corresponding frame portion independently. It is understood, of course, that the frame format of FIGURE 1B may be used with the FIGURE 3 system, as well.

Figure 4:
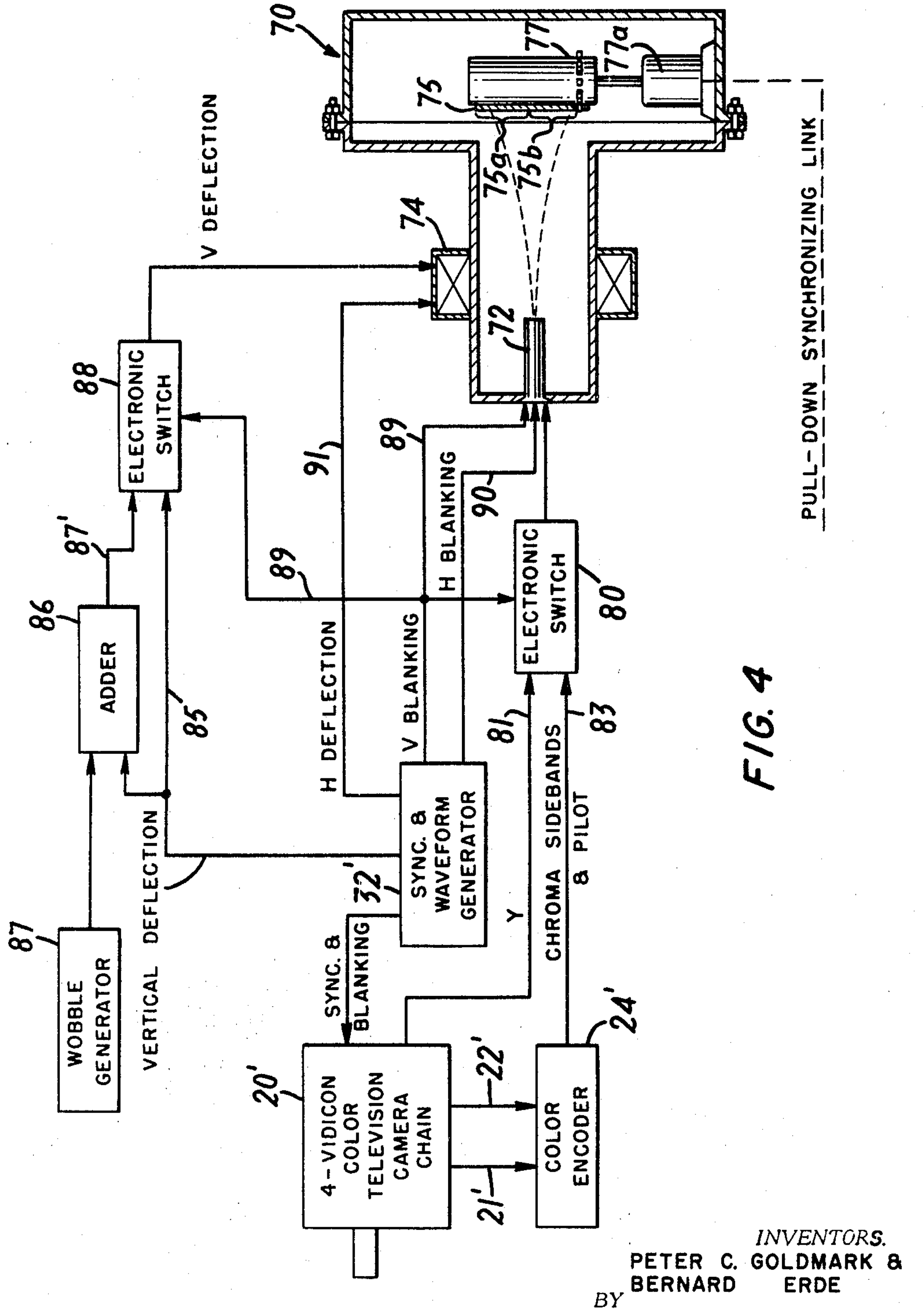
FIGURE 4 is a schematic diagram of another system for producing a color picture record of the type illustrated in FIGURE 1, employing electron beam recording.

FIGURE 4 illustrates a system for recording luminance and color information with a single electron beam recording camera 70. The camera 70 includes a gun 72 productive of a recording electron beam and horizontal and vertical beam-deflecting coils 74 for sweeping the position of beam impingement on the record medium 75. The record medium 75 is supported and advanced through the camera 70 by sprocket drive mechanism 77, including a motor or actuator 77*a*, which is synchronized in the manner described above with the scanning rate of the color television camera chain 20' and the pull-down rate of the original film through the color film projector (not shown). To this end, the camera 70 and projector may be equipped with standard Geneva pull-down mechanisms.

Also in the manner previously discussed, the television camera chain 20' develops color information signals and feeds them over the conductors 21' and 22' to the color encoder 24'. In addition, television chain 20' develops an electrical brightness or luminance signal Y presents this signal to one input terminal of an electronic switch 80 over the conductor 81. The encoded chroma, or color information, signals are presented to a second input terminal of the electronic switch 80 over the conductor 83.

In the FIGURE 4 system, the record medium 75 may be advanced continuously or intermittently, as desired. For purpose of explanation, however, it will be assumed that the original film and record medium is advanced intermittently, for example at a rate of 15 frames/secs., whereby the record medium 75 is exposed with a raster scan of the electron recording beam.

A vertical deflection signal is developed by the synchronization and waveform generator 32' and routed over the conductor 85 to a conventional adder 86 and a second electronic switch 88, which is activated with the vertical blanking signals on the conductor 89 also developed by the generator 32'. The vertical blanking signals are also supplied to the electron gun 72, along with horizontal blanking signals on the conductor 90 to effect horizontal and vertical blanking in a conventional manner. The adder 86 receives as a second input from the wobble generator 87 an alternating current signal of a frequency substantially greater than the horizotnal line sweep rate. This alternating current signal adds to the vertical deflection signal to periodically vary or wobble the beam deflection over a narrow range. The wobbled deflection signal is provided to a second input terminal of the electronic switch 88 over the conductor 87'.

In operation, the FIGURE 4 system function as follows. Assume that the luminance signal Y is to be recorded in a succession of transverse scan lines across the lateral zone 75*a* on the record medium during a first television scanning field. The electronic switch 80 selects the Y signal on the conductor 81 and passes it to the electron gun 72. At the same time, the electronic switch 88 selects the non-wobbled vertical deflection signal on the conductor 85 and presents this signal to the vertical deflection terminal of the deflection coil unit 74. Horizontal deflection is supplied to the horizontal deflection terminal of the deflecting coils 74 over the conductor 91 from the synchronization and waveform generator 32'. During the next color television scanning field (1/60 sec.) a corresponding succession of field lines, interlaced with the lines of the first field, is laid down on the record medium 75 across the later zone 75*a*.

The electronic switches 80 and 88 are designed for activation upon the occurrence of every second vertical blanking pulse on the conductor 88 so that at the end of the first pair of television scanning fields, each of the electronic switches 80 and 88 are energized to select the signals at the other of their input terminals. At the same time a residual bias voltage is added to the horizontal deflection signal developed by the generator 32' so that the electron beam is shifted to record chroma information in the laterally displaced zone 75*b* on the record medium 75. The intensity of the beam from the electron gun 72 is now modulated with the chroma sidebands and pilot carrier from the color encoder 24'.

During recording of chroma information, the electron beam is also given a periodic limited longitudinal deflection due to the addition to the vertical deflection signal of the signal from the wobble generator 87. Each of the transverse record lines traced out across the lateral zone 75*b*, therefore, is effectively widened to fill the interline spaces and thereby make the record lines substantially contiguous. By thus effectively widening the record lines, greater tracking inaccuracies can be tolerated when the record medium is reproduced. It has been found that any deterioration of color resolution ascribable to the recording of color information in a single field, rather than in a full television frame, is basically undetectable visually when the record is reproduced. Since, however, the bandwidth of the chroma signals need not be limited when recorded separately from the luminance information, the over-all color resolution is more than satisfactory.

An alternative approach to improving the quality of the recorded color information is to double the scanning rate of the television chain 20' during alternate television scanning frames. In this instance the sweep rate of the recording beam is also doubled to record the chroma signals in a 525 line sequence, and the bandwidth capability of the television camera equipment must also be increased twofold. To this end, the synchronization generator may be adapted to supply the camera chain 20' and record medium camera 70 with the appropriate deflection signals so that the horizontal and vertical sweep rates are, for example, approximately 31,500 c.p.s. and 120 c.p.s., respectively, when the recording beam is in the position for recording color information, and are one-half those values when in the alternate position.

After completion of the television scanning field (262½ lines) in which chroma information is recorded. the electron beam from the gun 72 is suppressed by a vertical blanking signal from the waveform generator. This signal occurs during the time interval occupied by the next television scanning field, and the actuator 77*a* is energized to pull down, or advance, the record medium 75 for exposure of a successive frame to the electron recording beam.

From the foregoing description, it will be noted that luminance information is recorded in a full television raster format (two interlaced fields). Color information, on the other hand, is assigned only one of the scanning fields of a scanning field pair with the time occupied by the next scanning field reserved for advancement of the record medium 75. Notice should also be taken that the frame portions containing chroma and brightness information can be displaced longitudinally on the medium 75, as well as laterally. In such case, the vertical, rather than the horizontal, deflection signal is modified for positioning the beam.

Figures 5, 6, 7:
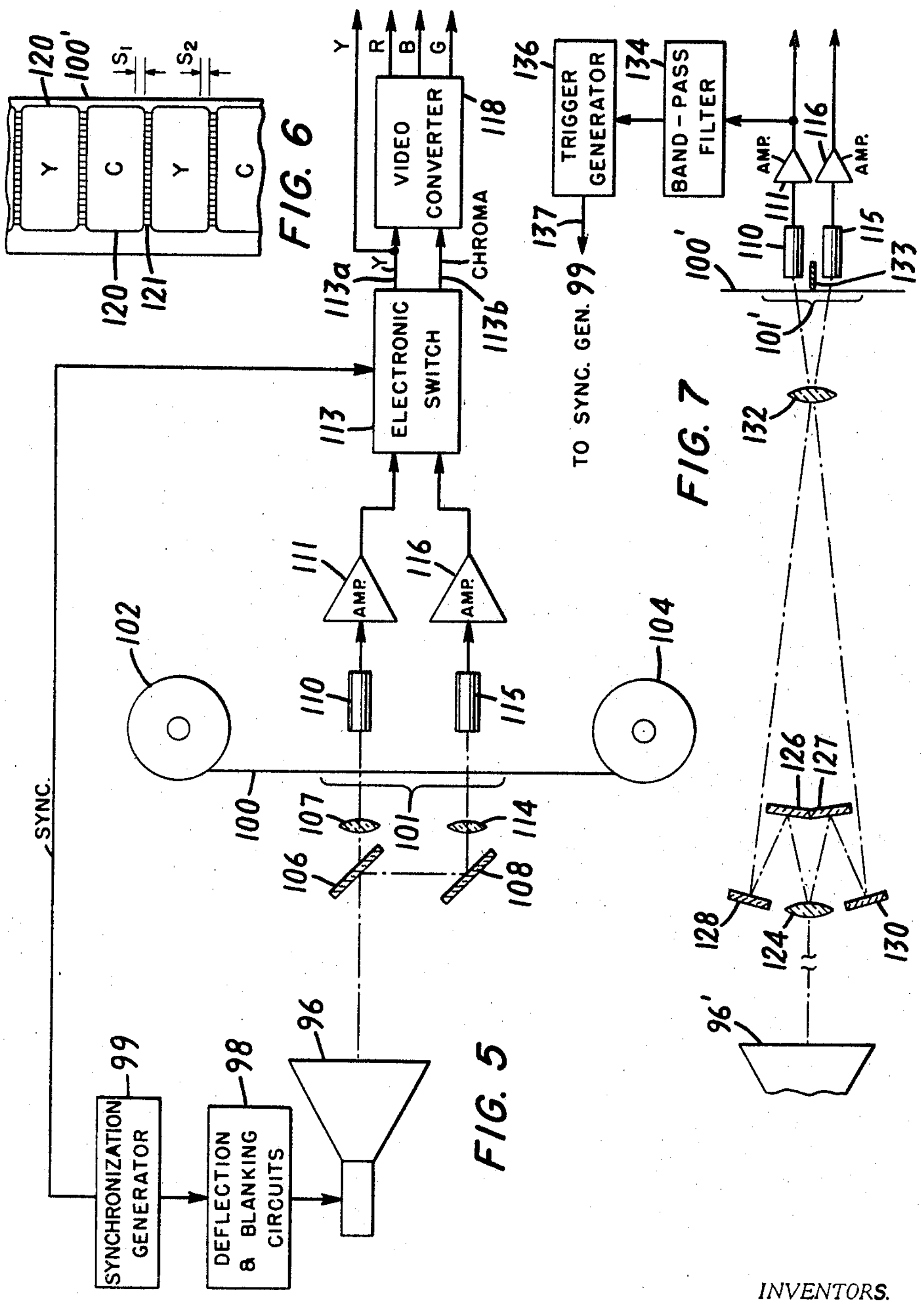
FIGURE 5 is a schematic block diagram of a system for reproducing luminance and color information signals from a color picture record of the type shown in FIGURE 1.
FIGURE 6 is a plan view of a portion of a record medium suitable for use with a raster scanning reproducing system.
FIGURE 7 is a schematic representation of apparatus to be used with the FIGURE 5 system for raster scanning of the record medium in FIGURE 6.

Turning now to FIG. 5, there is shown a system for reproducing luminance and color information signals from the color picture record of the type shown in FIGURE 1B, with the longitudinal dimension of each frame portion 12*a*, 14*a* equal. The system includes a cathode ray or line scan tube 96 which is supplied with horizontal deflection and blanking signals from the unit 98, which is synchronized with the operation of the synchronization generator 99. The color picture record 100 is advanced through a scanning zone 101 between a supply reel 102 and take-up reel 104. The scanning beam of the tube 96 passes through a half-silvered mirror 106 where some of the light is deflected to a reflective mirror 108. The portion of the light from the beam passing through the mirror 106 is intercepted by a focusing lens 107 and thereafter modulated by the information recorded in the uppermost frame portion being scanned. This modulation is detected by the photocell 110, amplified in the amplifier 111 and presented to one input terminal of an electronic switch 113.

The mirror 108 directs the reflected portion of the scanning beam through the focusing lens 114 to the lowermost frame portion of the color picture record 100, which modulates the beam with the information recorded in this portion. Similarly, the second photocell 115 detects this modulation and converts it into an electrical signal which is amplified in the amplifier 116 and fed to the second input terminal of the electronic switch 113. In the described manner, the photocells 110, 115 alternately detect luminance and color information.

The electronic switch 113 is arranged for energization at the completion of scanning of each frame portion of the color picture record 100 so that luminance and color information are continuously directed to the same output conductors 113*a*, and 113*b*, respectively of the electronic switch. For the purpose of synchronizing the operation of the switch 113 with the scanning of the frame portion, the switch 113 is supplied with signals locked with the vertical blanking signals from the synchronization generator 99.

The luminance signal Y and chroma information on the conductors 113*a* and 113*b* are next received by the video converter 118, which may be of the type more fully described in the previously mentioned application Ser. No. 519,106. The outputs of the video converter are then the red, blue and green (or I and Q) color picture signals for conventional color television transmission.

The FIGURE 5 system may also be adapted for interrogating the record medium 100 with a raster scan. In this instance, the cathode ray tube is excited with suitable vertical and horizontal deflection and blanking signals from the unit 98 to trace out a raster field in the scanning zone 101. In this connection, conventional television scanning rates can be used for direct television broadcasting of the reproduced information. When continuous motion of the record 100 is desired, a pair of rasters is used to scan the luminance and chroma information recorded in adjacent frame portions, as will be discussed shortly in connection with FIGURE 7.

FIGURE 6 illustrates a preferred form of record medium 100' which may be reproduced with both line and raster scanning. In this film, each of the frame portions 120 is made of equal longitudinal and transverse dimension, with luminance (Y) information and chrominance (C) information being carried in alternate frame portions. An unrecorded strip is left along the left- or right-hand edge of the film to accommodate a sound track or sprocket holes, if desired.

Disposed in the spaces between adjacent frame portions 120 are synchronizing indicia which may be used to develop a synchronization signal for controlling periodicity of the raster scans. These indicia are shown in FIGURE 6 to include several laterally spaced bars 121 which, when scanned by a line of a raster or line scan, produce a periodically varying signal of a frequency appreciably distinct from the frequency of any video information carried by the film. For example, these bars may be so arranged to produce a frequency of about 100 kc./sec. (at the lower edge of the video frequency spectrum) which can be readily distinguished from the higher frequency components of video information.

FIGURE 7 shows apparatus which may be used with the FIGURE 5 system for reproducing the video information carried by the film shown in FIGURE 6. In this embodiment, a raster scan is used, thus enhancing the life of the phosphor material used in the scanner. In FIGURE 7, an image of a single raster scan is formed on the face of a cathode ray tube 96' and received by a conventional lens 124 which directs the full raster image to each of a pair mirrors 126, 127 whose reflective surfaces are displaced from a plane perpendicular to the axis of the lens 124 by a small angle, say, 5°. Mirrors 128 and 130 direct the images of the raster scan formed on the mirrors 126 and 127, respectively, to a lens 132 which, in turn, images separate rasters in the plane of the record medium 100'.

The raster images formed on the film 100' are reduced by the optical elements of the system to a height in the scanning zone 101' that is substantially less than the longitudinal dimension of the film frame portions 120. This height is preferably about $\frac{1}{10}$ the pitch distance between adjacent frame portions, and the raster images $s_1$ and $s_2$ formed on the film are longitudinally spaced-apart by the frame portion pitch distance, as best observed in FIGURE 6. It is understood that the rasters $s_1$ and $s_2$ are each composed of a succession of vertically displaced scan lines across the film 100', with successive scan lines displaced in a direction opposite to the direction of film motion through the zone 101'.

During scanning, the record medium frames may be scanned at conventional television scanning rates, i.e., 30 frames per second, so that each frame portion containing luminance and chrominance information is scanned every $\frac{1}{60}$ second. Likewise, the periodicity or repeat frequency of the raster developed by the cathode ray tube 96' is also 60 per second, so that each frame portion 120 of the record medium is scanned once by each of the raster scans $s_1$ and $s_2$. As in FIGURE 5, the photo detectors 110 and 115 develop electrical signals representative of the video information carried by the respective frame portions. Operation of the FIGURE 7 optical arrangement, in conjunction with the system of FIGURE 5, is from this point on identical to that already described.

For the purpose of synchronizing the periodicity of the raster scan with the rate of advancement of the record medium 100', a synchronization signal is developed whenever individual lines of one of the raster scans impinge upon the laterally spaced bars 121' in the interframe spaces of the film 100'. This scanning action, as previously noted, develops a periodic waveform which may be readily separated from the composite video signal by, for example, the bandpass filter 134 receiving the output signal from the amplifier 111. Alternatively, a tuned amplifier may be used in place of the bandpass filter and may be connected to either the output of the photodetector 110 or the amplifier 111.

The output of the bandpass filter 134 is used to initiate a synchronizing trigger signal in a trigger generator 136 the output of which provides a series of synchronizing pulses on the output lead 137. These pulses may be applied to the synchronization generator 99 to initiate a new scan after a predetermined time interval and to generate in the generator 99 or in a separate waveform generator (not shown) a blanking signal for transmission along with the video information at the output of unit 118. With the FIGURE 7 system either a 525 line or 262½ line raster field may be used, the former being preferred for better resolution.

In order to ensure that each photodetector 110, 115 receives only the light signal from its associated raster image $s_1$, $s_2$, an opaque frame portion separator 133 is disposed between the photodetectors to block out any interfering light signals developed by scanning of the separate frame portions by the two raster scan images.

As an alternative, intermittent film motion can be employed, with the longitudinal dimensions of the raster images equal to the height of the record frame portions.

Although the invention has been described with reference to specific embodiments thereof, it is understood that many modifications and variations, both in form and detail, can be made within the skill of the art. All such modifications and variations, therefore, are intended to be included within the scope and spirit of the appended claims.

We claim:

1. In an apparatus for recording in monochrome on an elongate record medium color picture scenes contained in a succession of frames of an original record to be recorded, the combination of:

original record projector means for forming optical images of the original record scenes at a predetermined frame rate;

color television camera means adapted to view the optical image of each original scene for scanning with a pair of scanning fields each composed of a series of mutually displaced scan lines to thereby develop signals representing color information contained in the viewed original record scene;

record medium camera means including means for advancing the record medium for exposing successive frames of the record medium to an exposure zone;

means for recording on a first frame portion of the record medium in the exposure zone an image of luminance information in the scene viewed by the television camera means; and means responsive to the color information signals developed by the television camera means for recording in an adjacent frame portion of the record medium, during the time interval occupied by one of the scanning fields, an image of a monochrome representation of color information in the viewed scene;

the record medium advancing means being synchronized with the television camera means to advance the record medium during the time interval occupied by the other of the scanning fields of the pair to present a successive record medium frame to the exposure zone in the record medium camera means.

2. Apparatus according to claim 1, in which the luminance information recording means includes means for projecting an optical image of the viewed scene onto the first frame portion of the record medium.

3. Apparatus in accordance with claim 1, in which the means responsive to the color information signals includes a recording beam of which the intensity is modulated in accordance with the color information in the viewed scene for recording the monochrome representation image in a series of mutually displaced parallel record lines across the adjacent frame portion.

4. Apparatus as defined in claim 3, further comprising means for imparting a limited oscillatory deflection to the recording beam in a direction substantially perpendicular to the record lines, the frequency of oscillation of the beam being substantially greater than the rate at which the record lines are recorded, to thereby record the color information in a series of substantially contiguous record lines.

5. Apparatus in accordance with claim 1, in which:

the means responsive to the color information signals includes a cathode ray tube on the face of which an electron beam whose intensity is modulated in accordance with the color information in the viewed scene traces out a raster field;

the luminance information recording means includes means for projecting an optical image of the viewed scene into an image plane adjacent the face of the cathode ray tube; and the record medium camera means photographs the face of the cathode ray tube and the optical image projected onto the image plane, whereby the luminance and color information of the viewed scene is simultaneously recorded on the respective adjacent frame portions of the record medium in the exposure zone.

6. Apparatus as recited in claim 1, in which the original record is a color negative film and the color television camera means includes separate detector means each responsive to a primary color content of the images of the viewed scene for developing an intermediate color signal representative of the respective primary color, the apparatus further comprising means responsive to the respective intermediate color signals for reversing the instantaneous electrical polarities thereof, whereby the color information signals to be recorded correspond to the original color of the scene recorded on the color negative film.

7. Apparatus as defined in claim 1, in which:

the television camera means develops additionally an electrical signal representing luminance information in the viewed scene;

the record medium camera means includes means for exposing the record medium in the exposure zone with a recording beam;

the luminance information recording means includes means for modulating the intensity of the recording beam in accordance with the luminance information and for sweeping the beam so that the luminance information is recorded in the first frame portion in the series of mutually displaced record lines;

the means responsive to the color information signals includes means for modulating the recording beam in accordance with the color information in the viewed scene and for sweeping the beam to record the monochrome representation image in a similar series of mutually displaced lines across the adjacent frame portion, the apparatus further comprising means for positioning the recording beam to record luminance information in the first frame portion during the time interval occupied by a television scanning field pair and for positioning the recording beam to record color information in the adjacent frame portion during at least a part of the time interval occupied by a successive television scanning field pair.

8. Apparatus as recited in claim 7, in which the recording beam positioning means is synchronized with the occurrence of scanning field pairs to thereby reposition a recording beam once for each occurrence of a scanning fiield pair.

9. Apparatus in accordance with claim 8, in which the record medium advancing means advances the record medium during the time interval occupied by one field of a scanning field pair.

10. Apparatus as defined in claim 8, in which the sweep frequency of the recording beam when in the position for recording color information is twice the sweep frequency of the recording beam when in the position for recording luminance information.

11. Apparatus as recited in claim 9, in which the luminance information is recording in two series of mutually displaced lines across the first frame portion, the lines of the first and second series being interlaced.

12. Apparatus as recited in claim 1, wherein the record mediums camera means includes a second exposure zone displaced from the first exposure zone by a distance equal to a multiple of the pitch distance between successive frames of the record medium and the color information recording means exposes the adjacent frame portion of the record medium in the second exposure zone.

13. Apparatus as defined in claim 1 in which the luminance and color information recording means is effective to record the first and adjacent frame portions in relative longitudinally spaced relation on the record medium.

14. In apparatus for reproducting color picture information recorded on a record medium in a succession of frames each having a first portion carrying luminance picture information and a different portion carrying color picture information longitudinally spaced from the first frame portion, the combination of:

means for continuously advancing the record medium through a scanning zone;

means for scanning seriatim successive frame portions with a pair of scanning beams each tracing out a series of longitudinally displaced lines across the respective frame portion;

means responsive to the scanning means for developing electrical signals representative of the luminance and color information recorded in the respective frame portions; and switch means including first and second output terminals responsive to the luminance and color information signals for continuously directing to a respective output terminal a respective one of the luminance and color information signals.

15. Apparatus as defined in claim 14, in which the scanning means comprises:

means for developing a light spot raster scan composed of a succession of mutually displaced scan lines; and optical means interposed between the raster scan means and the record medium for projecting onto the record medium a pair of images of the raster scan longitudinally spaced apart in the scanning zone by a distance equal to the pitch distance between successive frame portions with successive scan lines of the raster scanning beams displaced in a direction opposite to the direction of advancement of the record medium.

16. Apparatus as defined in claim 14, in which each of the scanning beams scans a respective frame portion in a raster scan with successive scan lines thereof displaced in the scanning zone opposite to the direction of the advancement of the record medium, the longitudinal dimension of the raster scan in the scanning zone being less than the longitudinal dimension of a single frame portion.

17. Apparatus as set forth in claim 16, in which the longitudinal dimension of the raster scan in the scanning zone is approximately equal to one-tenth of the longitudinal dimension of the frame portions of the record medium.

18. Apparatus according to claim 16, in which the record medium includes synchronizing indicia disposed thereon in association with the spaces between adjacent frame portions so as to produce, when scanned by the scanning means, a synchronization signal distinct from the information recorded in the frame portions, the apparatus further comprising means responsive to the synchronization signal for controlling the periodicity of the raster scan to thereby scan each frame portion once by each raster scan.

19. In apparatus for recording in monochrome on an elongate record medium color picture scenes contained in successive frames of an original record to be recorded, the combination of:

original record projector means for forming separate optical images of color picture scenes in a pair of frames of the original record separated by a first multiple of the pitch distance between successive frames thereof;

record medium camera means for conveying the record medium and for exposing separate frame portions of the record medium separated by a distance corresponding to a frame pitch distance multiple related to the first multiple;

color television camera means adapted to view the optical image of the scene in one frame of the original record frame pair for scanning to thereby develop signals representing color information contained in the viewed scene;

means responsive to the color information signals for recording in a first of the separate frame portions an image of a monochrome representation of the color information in the viewed scene; and means for recording in the other of the separate frame portions an image of luminance information in the viewed scene.

20. Apparatus in accordance with claim 19, in which the first multiple associated with the original record frames is equal to the multiple associated with the record medium frames.

21. Apparatus in accordance with claim 20, in which the first multiple associated with the original record frames is unequal to the multiple associated with the record medium frames.

22. A method for recording in monochrome on a record medium color picture scenes contained in a succession of frames of an original record to be recorded, comprising the steps of:

forming optical images of the original record scenes at a predetermined frame rate;

scanning the optical image of each original scene with a pair of scanning fields each composed of a series of mutually displaced scan lines to develop signals representing color information contained in the scanned original record scene;

recording in a first frame portion of the record medium an image of luminance information in the scanned scene;

recording in a separate frame portion of the record medium, during the time interval occupied by one of said scanning fields, an image of a monochrome representation of color information in the scanned scene; and advancing the record medium during the time interval occupied by the other of the scanning fields of the pair for the recording of a successive frame thereof.

23. A method as recited in claim 22, in which the monochrome representation and luminance information images are recorded simultaneously.

24. A method as recited in claim 19, in which the monochrome representation and luminance information images are recorded sequentially.

25. A method for reproducing color picture information recorded on a record medium in a succession of frames each having a first portion carrying luminance picture information and a different portion carrying color picture information longitudinally spaced from the first frame portion, comprising the steps of:

continuously advancing the record medium through a scanning zone;

simultaneously scanning seriatim two successive frame portions with a respective raster scan each composed of a succession of longitudinally mutually displaced scan lines across the record medium, with successive scan lines of the raster scan displaced in a direction opposite to the direction of advancement of the record medium; and developing in response to scanning by the raster scans electrical signals representative of the luminance and color information recorded in the respective frame portions.

26. A method as defined in claim 25, in which the longitudinal dimension of the raster scans in the scanning zone is substantially less than the longitudinal dimension of the respective frame portions being scanned thereby.

References Cited

UNITED STATES PATENTS 2,953,633 9/1960 Hughes ------------ 178—5.2

RICHARD MURRAY, Primary Examiner

JOHN MARTIN, Assistant Examiner

U.S. Cl. X.R.

178—6.7, 7.2